United States Patent Office 3,198,617
Patented Aug. 3, 1965

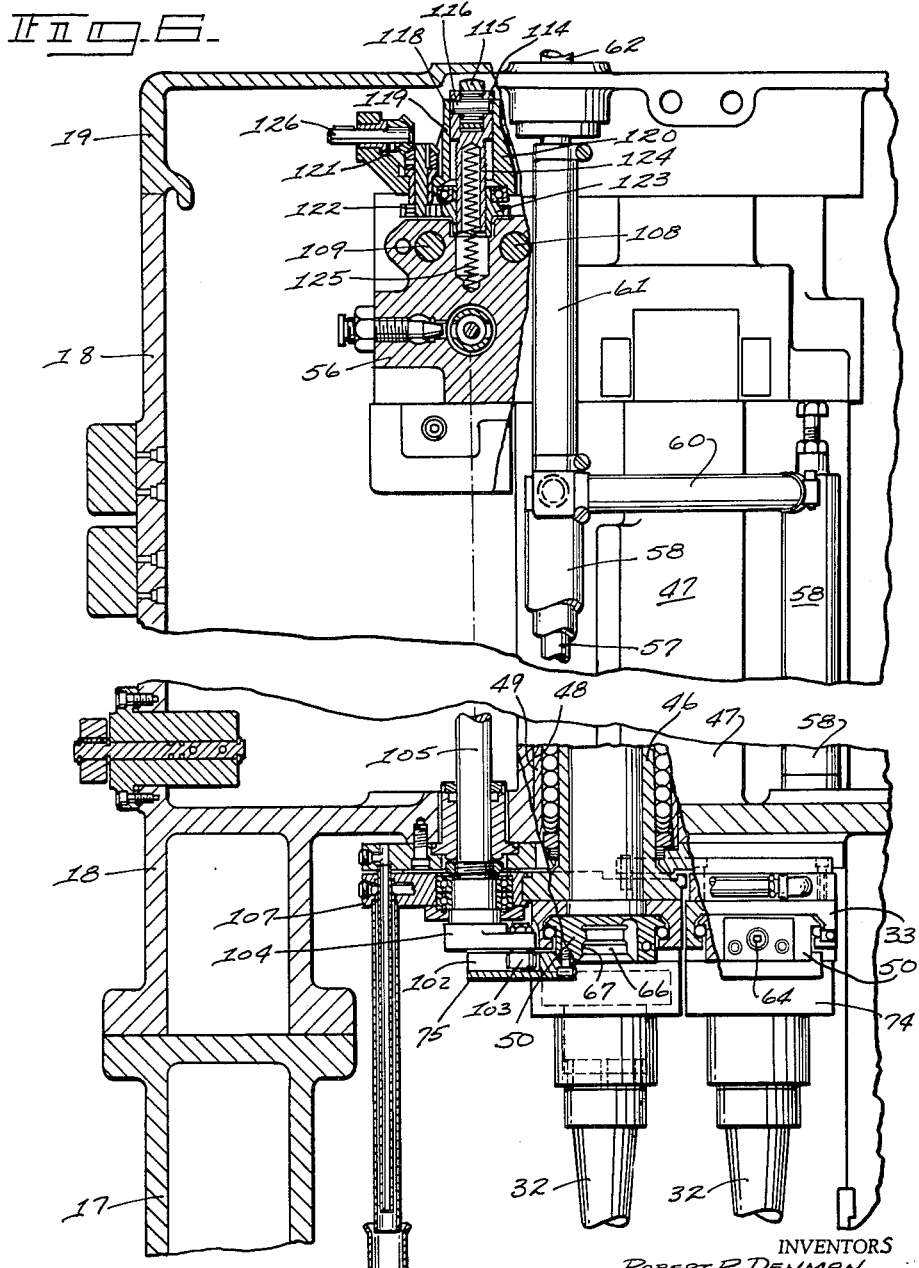

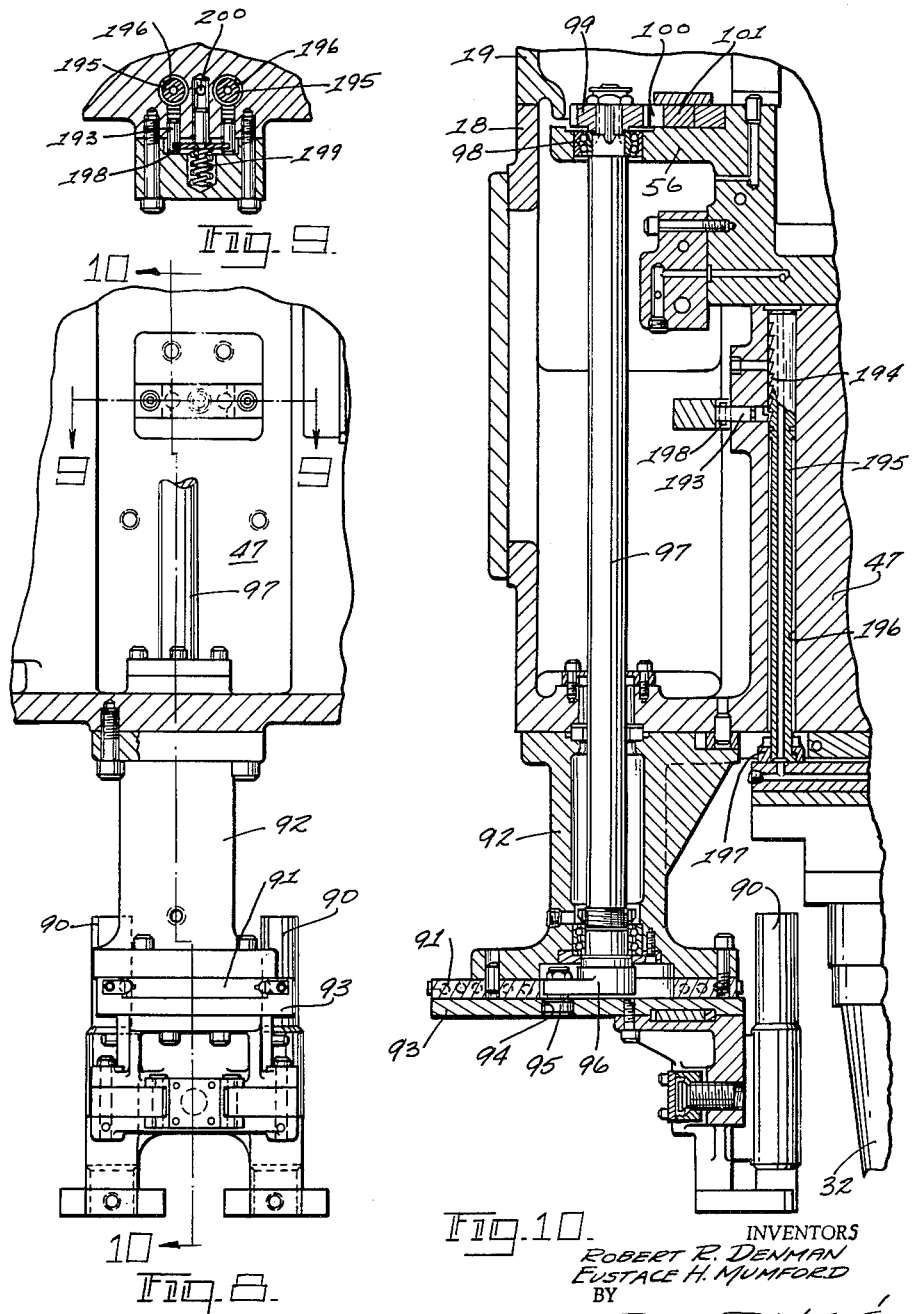

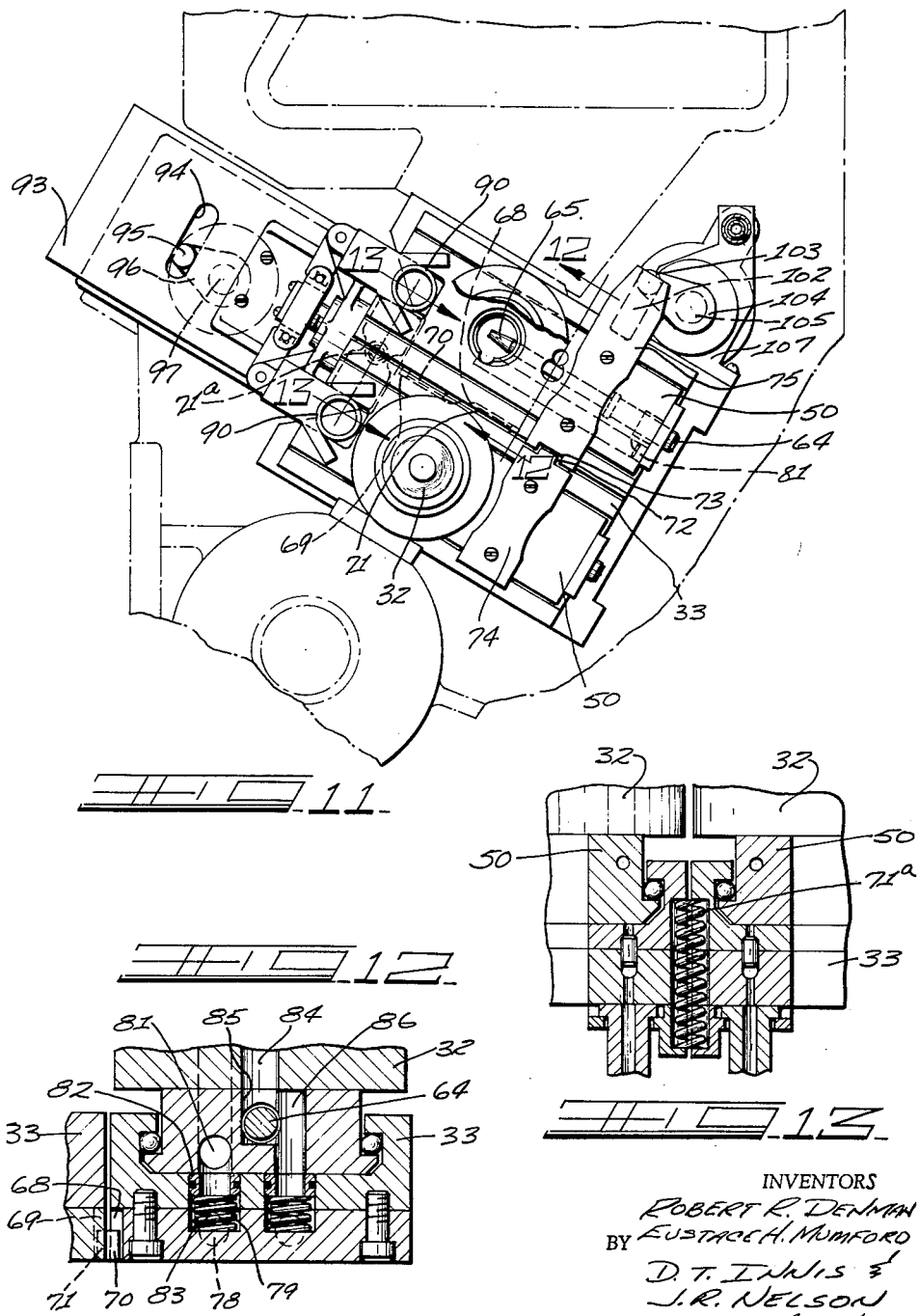

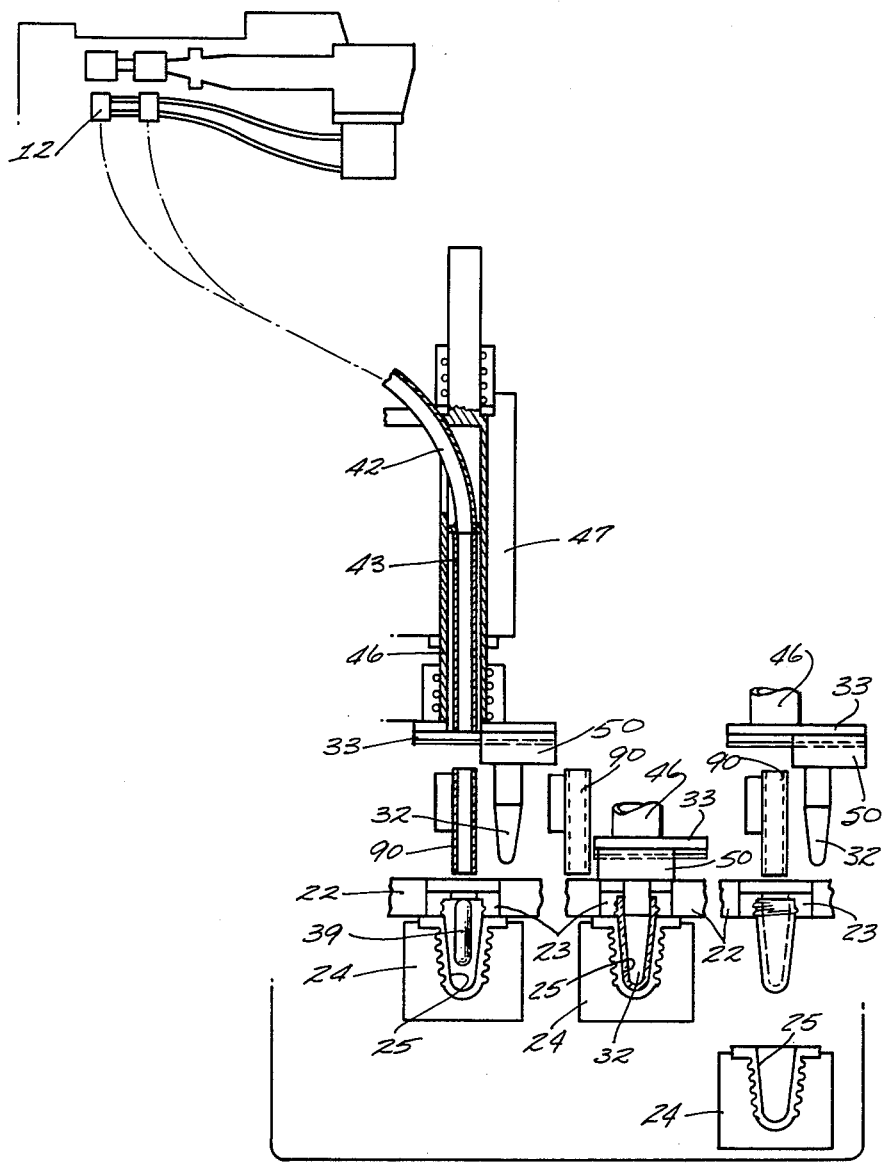

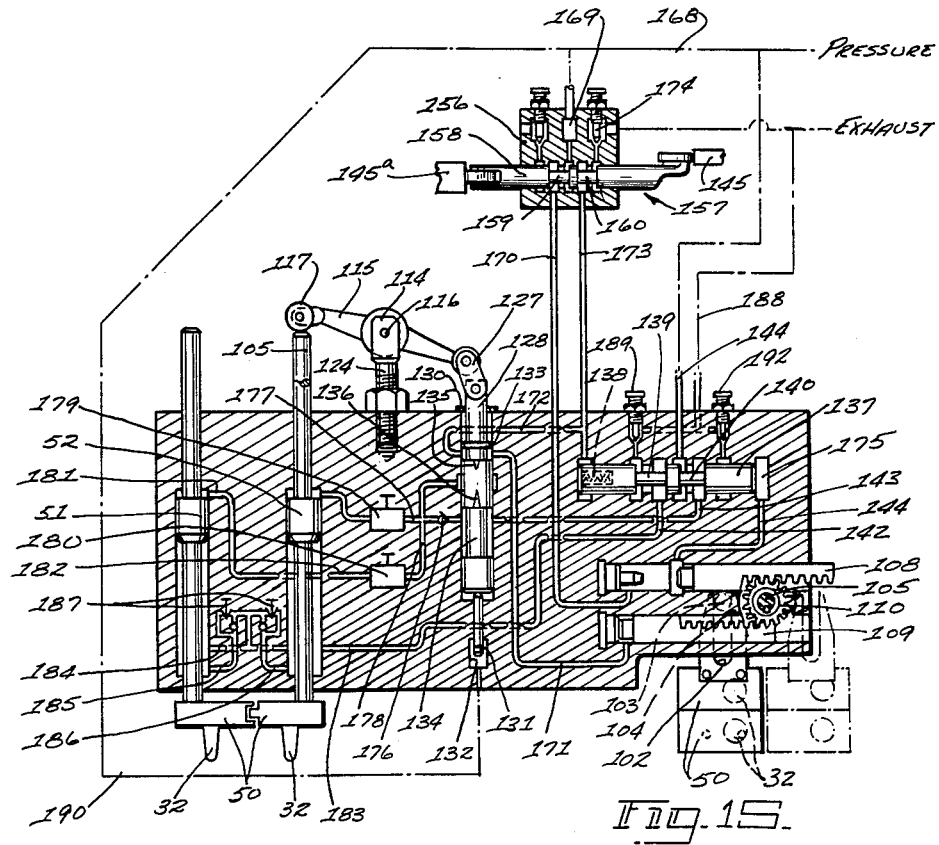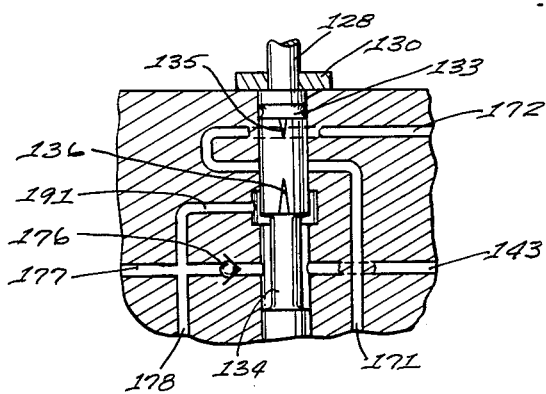

3,198,617
MECHANISM FOR PRESSING CHARGES OF MOLTEN GLASS IN A FORMING MOLD
Robert R. Denman, Toledo, Ohio, and Eustace H. Mumford, Ottawa Lake, Mich., assignors to Owens-Illinois Glass Company, a corporation of Ohio
Continuation of application Ser. No. 845,238, Oct. 8, 1959. This application Oct. 4, 1960, Ser. No. 60,416
4 Claims. (Cl. 65—207)

This application is a continuation of applicants' copending application Ser. No. 845,238, filed October 8, 1959, now abandoned.

The present invention relates to glass forming and shaping mechanisms, and in particular to mechanisms for delivering charges of molten glass to parison shaping molds and the shaping of such charges therein. Such shaping may be performed either by pressing a parison from which a final article may be ultimately blown or the pressing of a final shaped article.

In the present day machines of the gob-fed type, it is the usual procedure to charge the mold by one of the two methods, (1) deliver the gob to the mold at the station preceding the pressing thereof, or (2) by charging the mold at the pressing station with a side or deflected delivery of the gob to the mold. The inherent difficulty of the first method (1) is that the gob must rest in physical contact with the walls of the mold for an undue period of time and is therefore subjected to an excessive and detrimental chill prior to pressing. In the second method (2), the plunger is above and in alignment with the mold cavity at the time of delivery of the gob to the mold, thus making the side or deflected delivery of the charge mandatory. Furthermore, the deflected delivery of the gob presents not only unequal chilling but also the uncontrolled collapsing of the gob in the mold in such manner as to entrap air and chilled skin portions which will not disappear during the pressing operation and which will inherently result in detrimental marks in the finished ware.

In the present invention, the charges of molten glass will be delivered to a press mold at the pressing station by being delivered downwardly through the main gob guide system which will always remain in vertical alignment with a vertical path passing through the vertical axis of the mold cavity at the pressing position, thus insuring accurate central delivery of the gob to the mold cavity. The gob will be delivered directly through that vertical zone or path, which in the usual form of machines of this type, is normally occupied by the pressing plunger. The charge will then be immediately pressed into shape at this receiving station by bringing the plunger into said vertical path and moving it downwardly therein directly behind the downwardly moving gob to thus bring the plunger into contact with the molten glass in the mold immediately upon the establishment of contact between the mold and glass and without any appreciable delay between the delivery of the gob and pressing thereof. The above described operation is accomplished by the provision of a combined delivery and pressing mechanism comprised of the gob guide and pressing plunger, both of which are so arranged so as to cooperate to form a complete pressing unit.

It is the primary object of this invention to provide a mechanism capable of a high degree of flexibility to permit rapid actuation thereof, as well as full overlap of the operative movements of the various mechanisms to thus permit an improved high speed of production of finished ware.

A further object is the utilization of a plurality of like mechanisms adapted for overlap movements for a high increase in both quality of ware and of production thereof.

It is still a further object of this invention to provide apparatus for shaping successive charges of molten glass into finished ware of high quality and at high speeds of production.

Other objects will be apparent from the following descriptive matter taken in conjunction with the drawings wherein:

FIG. 6 is a sectional detail view taken at line 6—6 on FIG. 2 and illustrates the adjustability of the control mechanism of FIG. 5;

FIG. 7 is a part sectional elevation of the lower portion of the pressing mechanism and illustrates the horizontal slide mounting and operating mechanism for shifting the plungers;

FIG. 8 is a rear elevation of the shifting mechanism support for the auxiliary gob guide sections and mold spray mechanism;

FIG. 9 is a sectional detail of a fluid pressure operated detent for retaining the press plungers in up position and is taken at line 9—9 on FIG. 8;

FIG. 10 is a sectional elevation taken at line 10—10 on FIGS. 2 and 8, and illustrates the gob guide shifting mechanism and the mounting for the intermediate guides;

FIG. 11 is a bottom view of the press plunger and gob guide shifting mechanism;

FIG. 12 is an inverted sectional view taken at line 12—12 on FIG. 11 and illustrates the connections for transmitting cooling fluids from the slideway to the slides carrying the press plungers and to the plungers;

FIG. 13 is also an inverted sectional view taken at line 13—13 on FIG. 11 and illustrates the resilient mounting as between the pressing plunger slideways;

FIG. 14 is a schematic view illustrating the several mechanical steps involved in forming glass with this present mechanism;

FIG. 15 is a schematic view of the fluid pressure system of this mechanism; and

FIG. 16 is an enlarged view of the upstroke snubbing control or regulating valve of the pressure system of FIG. 15, but shown in its alternate position.

Figure 1:
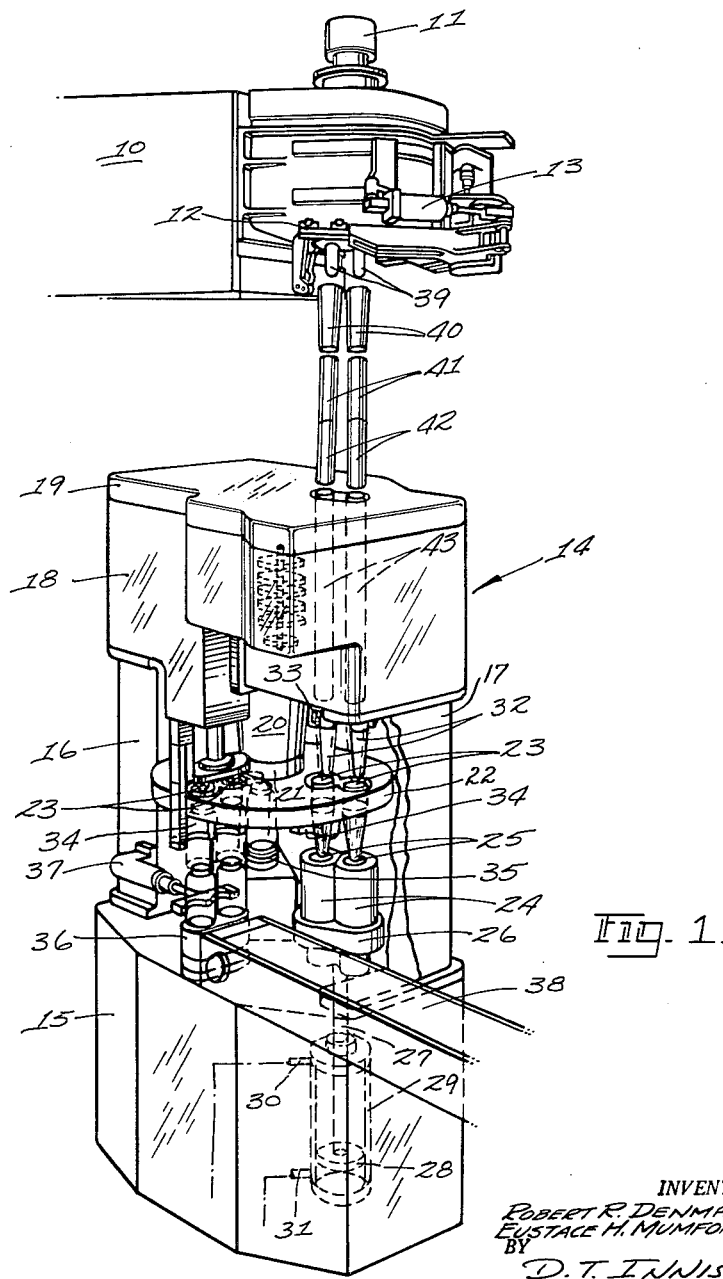
FIG. 1 is an elevational and perspective view of a machine unit embodying the invention.

The accompanying drawings illustrate the present invention as a mechanism for use in a plural mold, double gob operation in the pressing of glass articles or parisons for producing blown containers by a press-and-blow process. However, this invention is not to be limited to use in double gob operation as it may also be applied to single mold and single gob operation. In addition, this invention is also applicable to the pressing of finished glass articles in either a single or double cavity pressing process for production of pressed ware.

As illustrated, there is disclosed the conventional glass feeder of the double-gob type, said feeder arranged to simultaneously deliver a plurality of gobs to gob guides, sections of which are vertically disposed with their longitudinal axis in side-by-side arrangement. The vertically disposed section of the gob guides directs gobs downwardly through the upper structure of the forming machine.

These vertical gob guide sections are permanently positioned at a glass forming station and are arranged for cooperation with vertically reciprocating sleeve members which form a part of the plunger supporting mechanism. These sleeves are provided at their lower ends with horizontally disposed slideways in each of which is mounted a slide carrying a vertically disposed plunger. These plungers are arranged in side-by-side relationship corresponding to and having axes parallel to the axes of the vertical gob guide sections. Each said slide member is adapted for horizontal reciprocation in order to provide a means whereby both said plungers may be moved alternately into and out of vertical alignment with the axes of the gob guide sections.

Positioned beneath the gob guides and plungers is a glass shaping or parison mold which is also provided with plural cavities and with the vertical axis of each cavity thereof in alignment with the vertical axis of a vertical gob guide section. The vertical gob guides and the parison mold cavities always remain at the forming station and in vertical alignment with each other, but they are so mounted as to be capable of relative movement with respect to each other along their aligned vertical axes.

A neck mold turret is provided for carrying a series of sets of plural cavitied neck molds, with each set thereof equally spaced about the circumference of the turret. The turret is arranged for step-by-step rotation about a vertical axis to bring each set of neck molds successively into alignment with the aligned vertical axes of said guides and parison mold cavities and interposed said guides and parison cavities.

With the positioning of a set of neck molds at the forming station, the gob feeder severs and drops a plurality of gobs into the gob guides and the vertical sections thereof will guide them into their respective parison mold cavities. The vertically disposed pressing plungers are then moved horizontally along their respective horizontal slideways to bring each of them into alignment with the vertical axes of the stationary gob guides, the neck cavities and parison mold cavities, preparatory to pressing the gobs in said mold cavities. When the plungers are thus vertically aligned, the sleeve members will be moved telescopically downward with respect to the stationary gob guides and carry the plungers therewith. In the meantime, the parison mold has been moving upwardly until it is in contact with the lower surface of the neck molds where it comes to rest. The plungers continue to move down to a position where they extend through the neck molds and into the parison mold cavities, thereby displacing the molten glass in each parison mold cavity upwardly along its length and into the neck mold to form hollow parisons having a bead or neck finish on the upper end thereof.

With the completion of the pressing operation, the parison mold is moved downwardly, leaving the pressed parisons pendant from the neck molds. Simultaneously therewith, the plungers move upward and then horizontally out of alignment with the axes of the vertical gob guides and parison mold cavities. When the plunger ends have cleared the neck molds and the parison mold is below the bottom of the parisons, the neck mold turret is indexed, moving the neck molds and their pendant parisons horizontally to the blowing station.

As the neck molds and their parisons reach the blowing station, a succeeding set or pair of neck molds is simultaneously being positioned beneath the vertical gob guides and the parison mold has already begun to move upward into contact with this new set of neck molds. Just prior to the time that the parison mold contacts the set of neck molds, a succeeding set of gobs will be severed and deposited in the parison mold cavities for the next pressing operation. The above described operations will then be repeated in succession and in a controlled and timed order.

The timing, as between each phase of the forming operations, is such that full overlap of operations is obtained. For example, just as the severing of the gobs is completed, the parison mold will have just about come to rest in aligned contact with the neck molds, the pressing plungers will be ready for motion horizontally so that, at the approximate instant the gob reaches the bottom of the parison mold cavity, the plunger individual thereto will be in vertical alignment between the vertical gob guide and the mold cavity and is ready to, if not already, move down to the pressing position at the pressing station. In the succeeding phases of operation the plunger and mold cavities will move vertically away from each other, the plungers will move horizontally out of alignment, while at the same time the neck molds are moving to the next station. The next gobs are being formed and suspended for severing while the succeeding neck molds are moving into alignment with the guides and parison molds. The parison mold is on its way up to meet the succeeding neck molds as they come to rest at the forming or pressing station and the suspended gobs are being severed for the next parison formation.

With reference to the drawings and in particular to FIG. 1 thereof, there is illustrated therein a conventional feeder 10 having a reciprocating plunger 11, a double blade cutting shear 12 and a shear actuating cylinder 13.

Beneath the feeder 10 is positioned a forming machine generally designated 14. The forming machine is comprised of a base 15, vertical uprights 16 and 17 upon which is mounted an upper structure support member 18 and a covering cap member 19.

Extending downwardly from the support member 18 is a vertically disposed bearing bracket 20 arranged to support a vertically disposed drive shaft 21 upon the lower end of which is mounted a neck mold carrying turret 22. This turret carries or supports a plurality of sets of neck molds 23, each set being equally spaced circumferentially thereof, and the turret is arranged to transport these neck molds 23 from a forming station to a blowing station and thence to a ware takeout station in succession.

A parison mold 24 is located at the forming station and is arranged for vertical reciprocation to and from contact with the neck molds 23 on the turret 22. The parison mold 24 is provided with side-by-side shaping cavities 25 and is mounted upon a parison mold holder 26 attached to the upper end of a vertically disposed piston rod 27. This piston rod 27 and its piston 28 are arranged for reciprocation in a vertical cylinder 29. Fluid for operating the piston 28 is supplied to cylinder 29 through conduits 30 and 31 which are alternately connected to a suitable source of pressure fluid.

A pair of glass pressing plungers 32 are mounted in horizontal slideways 33 for reciprocation into and out of vertical alignment with the parison mold cavities 25 and are also arranged for vertical reciprocation to and from glass pressing relationship with respect to the parison molds 24.

A split finishing mold 34 (shown open in FIG. 1) with cooperating bottom plates 35 are provided at the blowing station. A ware lowering device 36 and a hydraulic ware transfer device 37 are provided at the takeout station to position the finished ware on a continuous belt conveyor 38.

Figure 2:
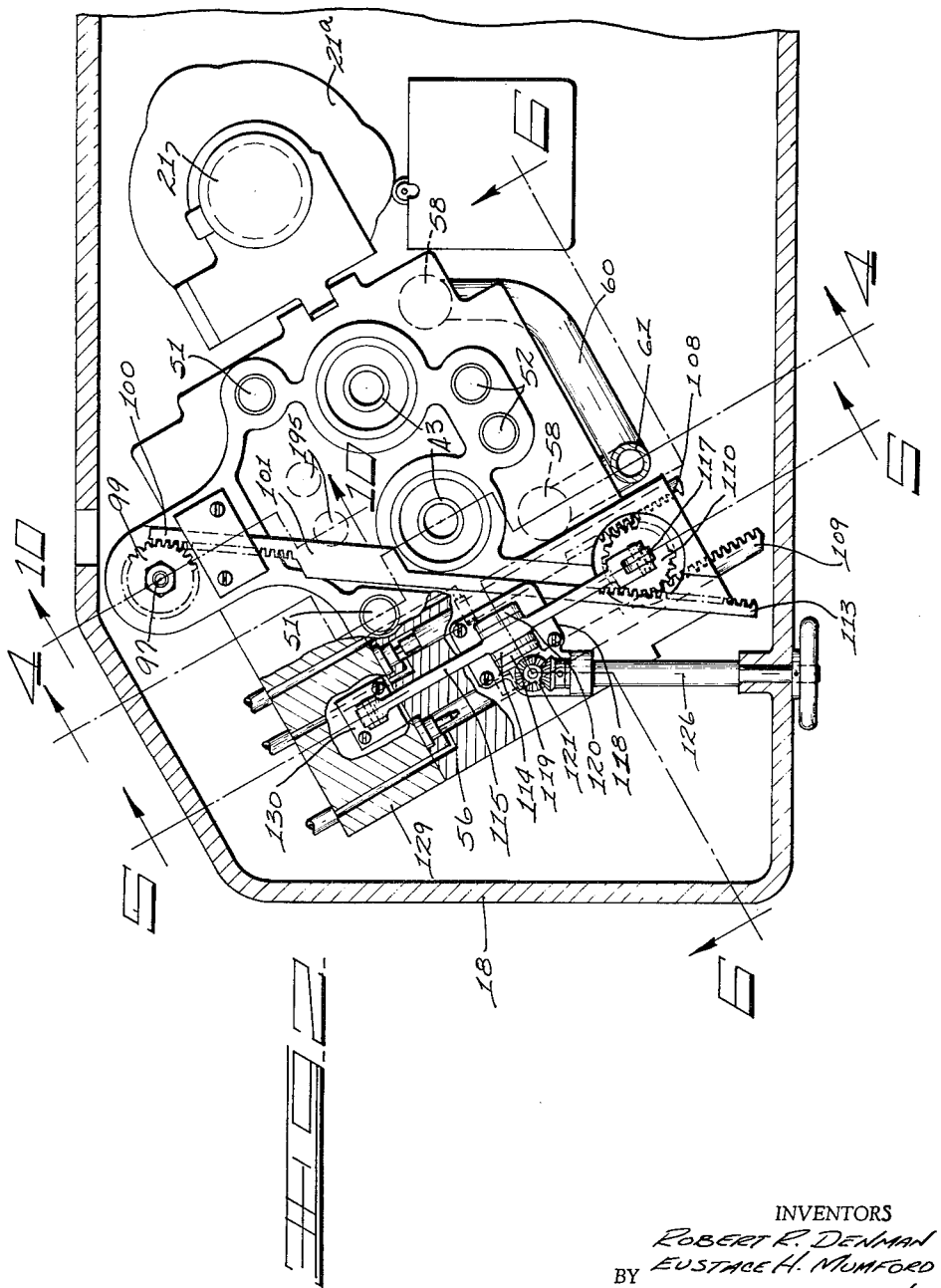
FIG. 2 is a schematic plan view of a portion of the upper structure of this mechanism and illustrates the gob guides and plunger shifting mechanism.

The neck mold turret 22 is arranged to be driven by a hydraulic driving unit 21a arranged upon the upper end of the drive shaft 21 (FIG. 2). This driving unit, which does not form the novel part of this present invention, is specifically illustrated and described in a copending application Serial No. 806,957, filed April 16, 1959, now Patent No. 3,009,444, dated November 21, 1961, and reference may be had thereto for full details of this drive mechanism. Essentially, this drive unit consists of a rotor fixed to the drive shaft 21 and enclosed in a rotor casing. The rotor and casing are arranged for successive intermittent rotation about the same axis and in the same direction, thereby providing a mechanism which will index the turret 22 step-by-step and present the several sets of neck molds 23 successively to the successive stations, namely, the forming or pressing station, the blowing station and the takeout station.

The gob feeding and guiding devices of this machine include the shearing mechanism 12 and 13 adapted to simultaneously sever a plurality of gobs 39 and drop them into a multisectioned guide device. This guide device consists of curved sections 40 which receive the gobs 39 as they are dropped and direct them to straight inclined sections 41. The inclined sections 41 guide the gobs into deflector sections 42 which in turn deliver the gobs to vertically disposed stationary gob guide sections 43.

Figure 4:
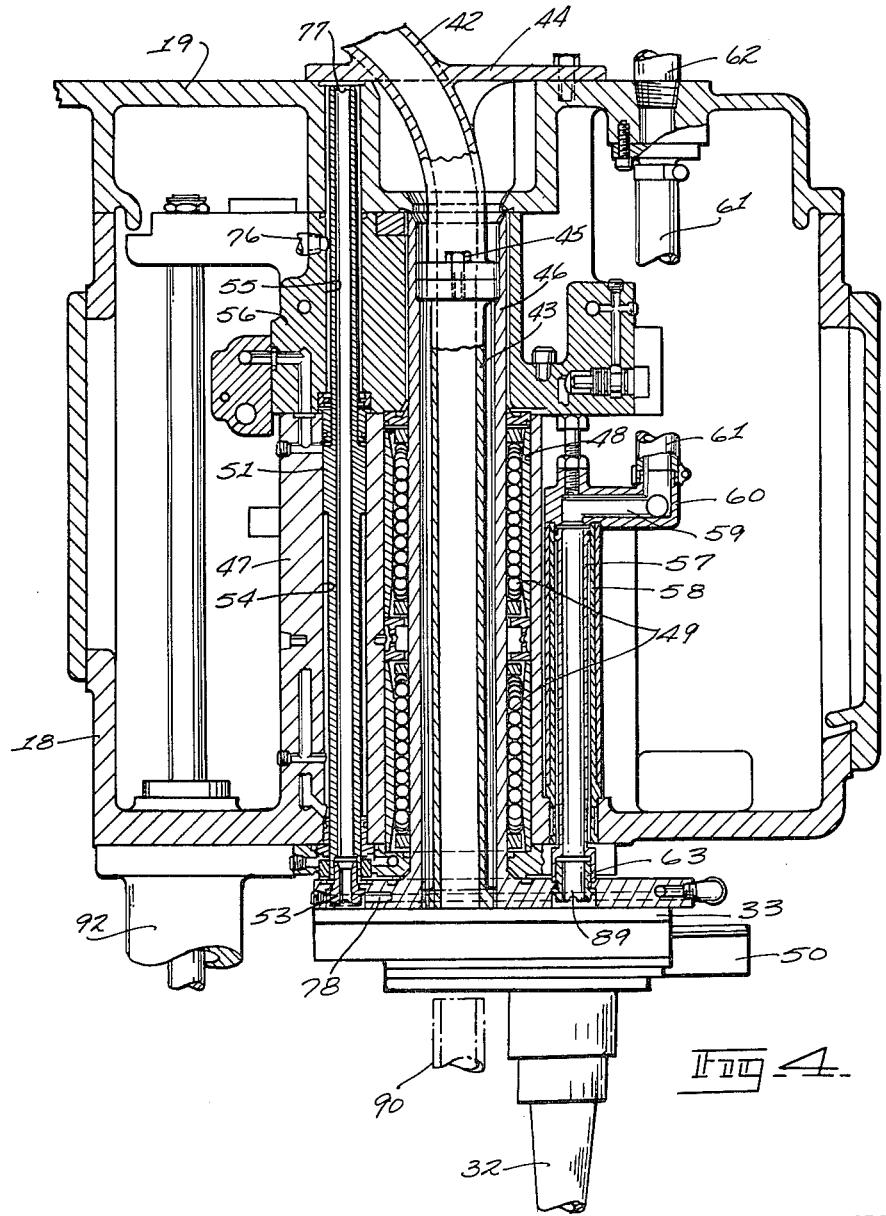
FIG. 4 is a sectional elevational view through one of the gob guides taken at line 4—4 on FIG. 2 and illustrates the actuating pistons for imparting vertical motion to the pressing plungers and the fluid connections therefore.

The guide sections 41, 42 and 43 are permanently retained stationary in the positions shown in FIGS. 1, 4, and 14 and the curved sections 40 may be movable into and out of register with the inclined sections 41. The gob deflector sections 42 are attached by a flange 44 to the upper surface of the covering cap member 19 of the upper structure support member 18 (FIG. 4), and the vertical guide sections 43 are in turn attached to, as at 45, and suspended from the deflector sections 42.

Referring specifically to FIGS. 4 and 7, where the mounting arrangement for the plungers 32 is shown, it should be kept in mind that there are two plungers and that both plungers will be similarly mounted in side-by-side relationship.

A pair of vertical guide sections 43 are positioned coaxially within a pair of tubular sleeve members 46 which are disposed in side-by-side relationship and adapted for vertical movement. The tubular sleeve members 46 serve in the capacity of mechanical guides for plungers 32 during vertical movement thereof.

The tubular sleeve members 46 are mounted in a vertically disposed bearing housing 47 formed as an integral part of the upper structure support member 18. A central bore 48 for each sleeve 46 is formed in the bearing housing 47 into which is fitted ball bearing bushings 49. These bearing bushings not only surround, but they also act as a guide for the sleeve member 46 and reduce the friction to a minimum in this high speed operating mechanism.

Formed on the lower end of each sleeve 46 and as an integral part thereof is the horizontally disposed slideways 23, each said slideway having mounted for sliding movement therein, a slide 50 and each slide is adapted to carry a glass shaping plunger 32. Also mounted in the vertical bearing housing 47 and individual to each slideway 33 are pairs of hollow, piston-like members 51 and 52 (FIGS. 2 and 4). These members are attached to each slideway 33 by threaded fasteners 53 and are slidable in axially aligned vertical bores 54 and 55 respectively formed in the bearing housing 47 and an overlying support member 56. By reference to FIG. 2, it will be noted that there are two identical piston-like members 51 and two identical piston-like members 52, one for each slideway 33, and are arranged to apply vertical movement and pressure to the plunger slideway 33. Two additional piston-like members 57 are also provided, one for each slideway 33, and which are telescopically received in a conduit 58 fixed in the support structure 18. The conduits 58 are connected to a passageway 59 in a fitting 60 which in turn is connected to a conduit 61 (FIGS. 4 and 6) and thence to a muffler system through conduit 62.

The pair of piston like members 57 which are provided one each to each slideway 33, are attached to each said slideway by the same means and in the same manner as previously described with respect to the members 51 and 52, namely, by screw-threaded members 63, as shown in FIG. 4.

By reference to FIGS. 2 and 4, it will be found that each slideway 33 has two pressure pistons attached thereto, namely, pistons 51 and 52, so that glass pressing pressure is applicable at equally spaced points from the center of the plunger 32 when same is brought to the glass pressing station. In addition, each slideway member 33 is provided with a piston-like member 57, which is arranged as a fluid exhaust channel (FIG. 4).

Referring now to FIGS. 7 and 11, it can be seen that each slide 50 has mounted thereon a glass pressing plunger 32 and each plunger is attached to the slide by a screw member 64 having a tapered end 65 which is adapted to pull the shank 66 of the plunger 32 into the shank socket 67 formed in the slide 50. Each slideway 33 is arranged to have limited vertical float relative to the other to thereby permit each plunger 32 to seat in the glass independently of the other when pressing the glass in the parison mold cavities 25. This float is provided by having, in the opposed side surfaces of the slideways 33 (FIGS. 11 and 12) cut-out-portions 68 and 69 into which keys 70 and 71 respectively fit. These keys may be formed as an integral part of their respective slideways 33. Thus, as shown in FIG. 12, the key 70 can move vertically in cut-out-portion 68 and key 71 can move vertically in cut-out portion 69, thus permitting relative vertical movement of each slideway 33 to a limited extent. As best illustrated in FIG. 13, a spring 71a is provided between the slideways 33 to maintain said slideways in parallel relationship when no pressing force is being applied. In addition, each slide 50 is connected to the other for coordinate horizontal movement by tongue 72 and groove 73 formed respectively on cross-members 74 and 75 attached to the lower faces of each slide 50. The clearance between the tongue 72 and groove 73 will permit freedom of horizontal alignment to each individual plunger 32.

Provision is made for applying a fluid coolant to each plunger 32 by the introduction of such coolant through a conduit 76 (FIG. 4) connected to the vertical bore 55 in the overlying support member 56. The fluid will flow from the bore 55 into the open upper end 77 of the piston 51, thence through a passageway 78 in slideway 33 to a chamber 79 (FIG. 12) formed in the slideway 33. Overlying the chamber 79 is a port 80 formed in slide 33. The port 80 communicates with a passageway 81 to convey the cooling fluid to the inside of the plunger 32. Within the chamber 79, there is an annular sealing ring 82 which is biased by a spring 83 against the top of the slide 50 to prevent leakage of the coolant between the abutting faces of the slide and slideway. The coolant, after passing into the inside of the plungers 32, returns through a passageway 84 in alignment with a port 85 in slide 50. The port 85 is in communication with a passageway 86, extending through the slide 50 and is in alignment with a second chamber 87 formed in the slideway 33. A passageway 88 connects the chamber 87 to the lower open end 89 of the piston-like members 57 (FIG. 4) from which the coolant is exhausted.

As previously mentioned herein, the plungers 32, besides being vertically movable to and from a press station, are also horizontally movable to and from a position in vertical alignment with the parison mold cavities 25 and the neck molds 23 for pressing operation. Whenever the plungers 23 are moved horizontally, a pair of intermediate gob guides 90 will also move horizontally into and out of alignment with the vertical gob guide sections 43 and the blank mold cavities 25. In other words, the intermediate gob guide sections 90 alternate with the plungers 32 in moving into and out of alignment between the vertical gob guide sections 43 and the blank mold cavities 25. The intermediate gob guides 90 are provided to insure that the gobs 39 are loaded properly in the parison mold cavities 25. In a sense, they bridge the gap between the vertical gob guide sections 43 and the neck molds 23 during delivery of the gobs 39.

The intermediate gob guides 90 (FIGS. 8, 10 and 14) move horizontally in timed sequence with respect to the horizontal movement of the slides 50 and their attached plungers 32. This movement of the intermediate gob guides 90 is provided through the following mechanism. A horizontal slideway 91 is forced on the lower end of a bracket 92 which depends from the under side of the upper structure support member 18 (FIGS. 9 and 10). A slide member 93 is mounted in the slideway 91 and adapted to slide relative thereto. The slide member 93 is arranged to be reciprocated horizontally and carries the intermediate gob guides therewith. The horizontal slide member 93 has a cam slot 94 therein into which a cam roller 95 is adapted to ride. The cam roller 95 is connected to one end of lever 96 which is in turn connected to a vertical drive shaft 97. The vertical drive shaft 97 extends from the slide member upward through the bracket 92 and the upper structure support member 18 and has its upper end supported in a bearing 98 carried by the overlying support member 56. The upper end of drive shaft 97 carries a pinion 99 rigidly attached thereto and arranged to mesh with teeth 100 on one end of a horizontally disposed rack 101 (FIGS. 2 and 10).

With reference to FIGS. 7 and 11, a description of the mechanism for effecting horizontal movement of the slides 50 and their attached plungers 32 will be given. The cross member 75 has a cam slot 102 formed in its upper surface and which receives a cam roller 103 mounted on the lower face of a lever 104, attached to a vertical drive shaft 105. The vertical drive shaft 105 is rotatably supported at its lower end in a bearing 106, fixed in a support member 107. The support member 107 is fixed to one of the slideways 33 and moved therewith during the vertical reciprocation of same to and from the pressing operation.

It should be apparent by observation of FIG. 11 that the rotation of shaft 105 and consequently lever 104, in a counterclockwise direction, will serve to move the crossmembers 74 and 75, the slides 50 and the plungers 32 to the right or out of vertical alignment with the parison mold cavities 25 and stationary gob guide sections 43.

Figure 5:
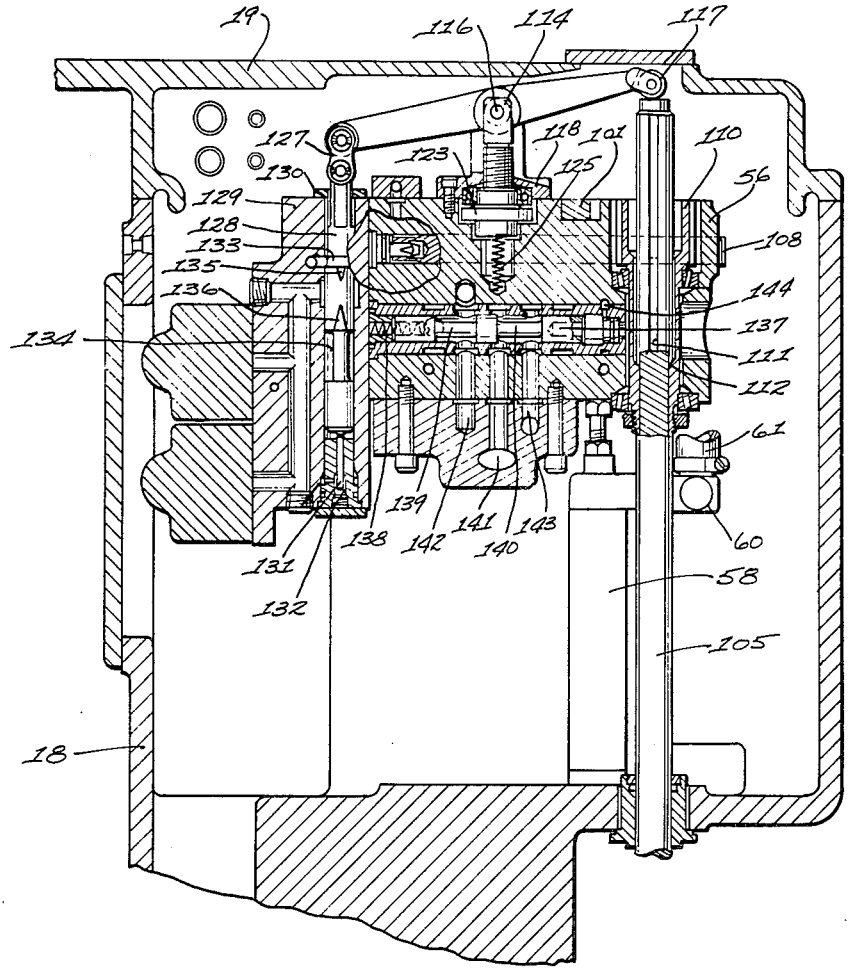
FIG. 5 is a sectional elevation taken at line 5—5 on FIG. 2 and illustrates the fluid driving control mechanism for shifting the pressing plungers horizontally to and from pressing position.

The rotation of shaft 105 is effected through a pair of piston driven power racks 108 and 109 which are also mounted in support member 56 in such a manner as to mesh with a gear 110, on opposite sides thereof (FIGS. 2, 5 and 7). These power racks 108 and 109 which are horizontally slidable in support member 56, are so arranged as to always remain in mesh with gear 110 and thus provide alternate driving of gear 110 and a controlled resistance thereto for the prevention of back lash or lost motion.

Shaft 105 is vertically slidable in the support member 56 and is also slidable vertically in the gear 110 which is mounted in the support member 56. This gear and shaft 105 are interconnected through a splined connection 111 and spline key 112.

The rack 101 extends horizontally across the top of the support member 56 and is provided on one end with teeth 113 which mesh with the gear 110 mounted on and attached to the upper end of shaft 105. The rack 101 thus provides an interconnection between shafts 105 and 97. The power racks 108 and 109 will drive both vertical shafts 105 and 97 simultaneously to thereby shift the plungers 32 and the intermediate gob guides 90 horizontally in the same time sequence.

In order to control the vertical, reciprocating movements of the plungers 32 and slideways 33, a mechanism has been provided for automatically regulating the flow of fluid pressure to and from the pistons 51 and 52. This mechanism is constructed and operated as follows with reference to FIGS. 2, 5 and 6.

A bearing bracket 114 is mounted on the upper surface of support member 56 and supports a lever 115 for rocking motion about a horizontal shaft 116. One end of lever 115 supports a roller 117 which has rolling engagement with vertical shaft 105 and through this shaft engagement provides rocking motion to lever 115 whenever shaft 105 is reciprocated. The bracket 114 is mounted within a second bracket 118, the side walls 119 and 120 of which prevent the bracket 114 from having any rotary or turning motion during vertical adjustment of said bracket 114. This bracket 114 is adjustable for the purpose of changing the vertical position of the horizontal shaft 116 and thereby vary the point at which contact will be established as between shaft 105 and roller 117. The position of shaft 116 is adjusted through rotation of a pair of miter gears 121 and a pinion 122 in mesh with a gear 123 threadedly connected to a shaft 124 that supports the bracket 114. A spring 125 is positioned beneath bracket 114 and tends to assist in the raising of the bracket when adjustment is being made. As can readily be seen when viewing FIG. 6, rotation of an input shaft 126 will rotate miter gears 121 resulting in rotation of pinion 122. As the pinion 122 is rotated it will mesh with and drive the internally threaded gear 123 resulting in vertical displacement of the bearing bracket 114 with respect to the support member 56.

Attached to the end opposite the roller 117 of lever 115 is a link 127 which interconnects lever 115 and a vertically reciprocable snubber valve 128. Valve 128 is disposed in an extension 129 of support member 56, but is, in effect, an integral part of member 56. A cap 130 fixed to the extension 129 at the upper end of the valve 128 provides a stop for the upward movement of the snubber valve and a pin 131 at the lower end of valve 128 provides a constant lifting force to this valve through the admission of constant pressure to a chamber 132 beneath pin 131. The snubber valve 128 is provided with relieved portions 133 and 134, which control the flow of operating fluid to the pistons 51 and 52 and also a pair of flat fluid feathering spots 135 and 136 are provided thereon for fine control and for pressure relief. The snubber valve 128 being interconnected to shaft 134, thereby provided means for snubbing the upward movement of the slides 33 and their respective plungers 32 as one part of its function. Furthermore, it acts to prevent vibration and excessive wear of the plunger operating mechanism.

Also mounted in support member 56 is a slide valve 137 which is horizontally disposed and is biased by a spring 138 at one end to generally maintain this valve in the position opposite to that shown in FIG. 5 to retain the plungers 32 in their up position. The valve 137 is relieved at 139 and 140 to permit flow of fluid from a main supply line 141 alternately to conduits 142 and 143 and to exhaust fluid from these same conduits in alternation. The shifting of valve 137 in one direction is accomplished by providing fluid to the end opposite to the spring 138 through conduit 144 only after the power rack 108 has been shifted to bring the plungers 32 in vertical alignment with the parison mold cavities 25 (FIG. 15). The shifting of valve 137 will control the supply of fluid above or beneath the pistons 51 and 52 for raising and lowering the plungers 32. It will be noted that the actuation of the power racks 108 and 109 is under control of a main cam 145, of a cam drum 146 (FIG. 3) and that the slide valve 137 is inoperative in the absence of operation of the power racks 108 and 109, and snubber valve 128.

The main cam drum 146 is provided on its outer cylindrical surface 147 with a series of groups of vertically spaced cam sectors, each group being comprised of a pair of cam plates and with each pair individual to a mechanical group. For example, cams 145 and 145a are individual to the mechanical groups for actuating the mechanisms which move the plungers 32 both horizontally and vertically.

Figure 3:
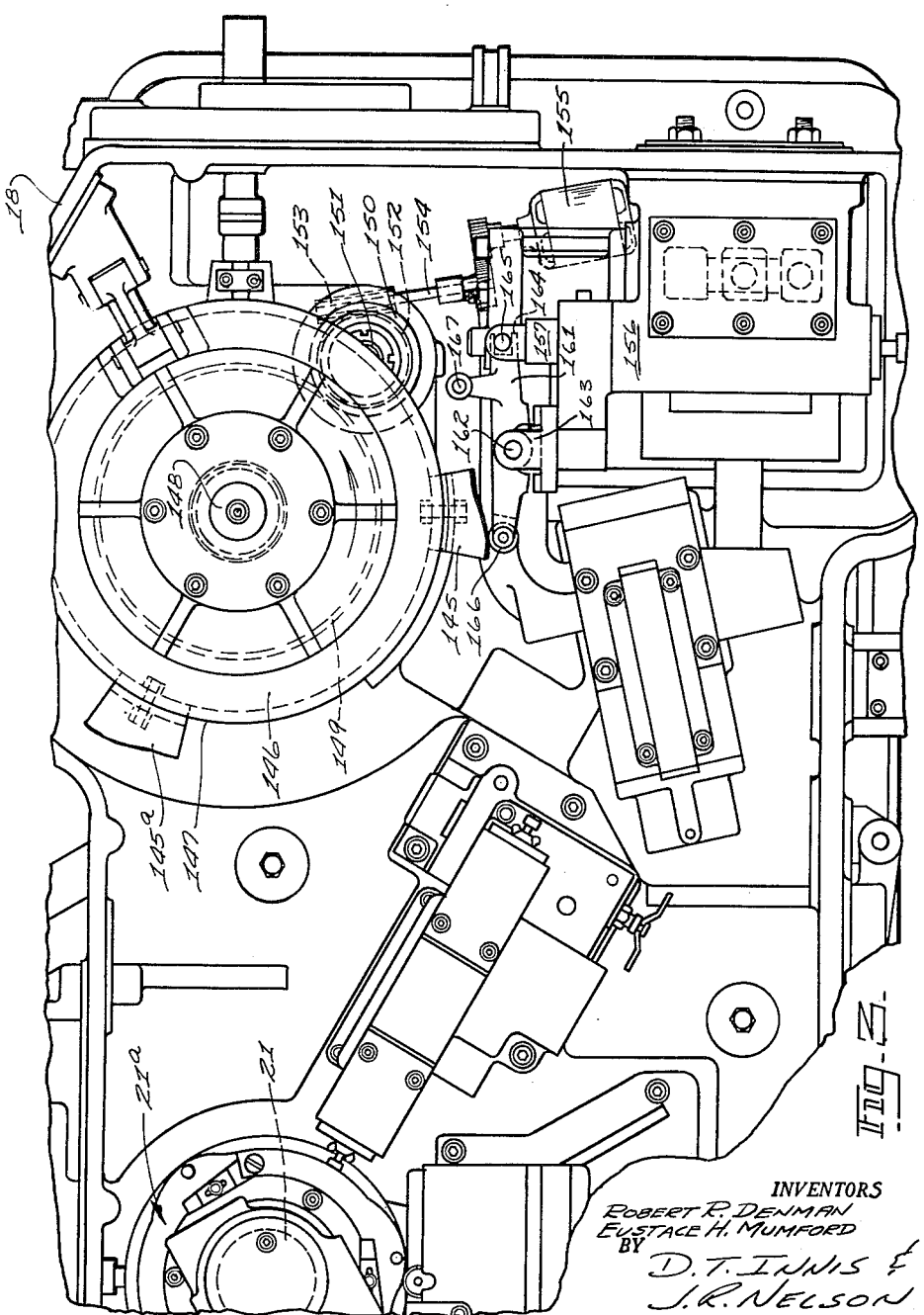
FIG. 3 is also a plan view of another portion of the upper structure and illustrates the timing cam drum and its drive.

The cam drum 146 is mounted for rotation about a vertical shaft 148, which in turn, is mounted in a bearing formed in the upper structure support member 18. A gear 149 is attached to the lower end of the drum 146 and is driven by a pinion gear 150 mounted on the upper end of a vertical shaft 151. A worm gear 152, mounted on the lower end of the shaft 151 is driven by a worm 153 attached to a drive shaft 154. A variable speed motor 155 drives the drive shaft 154 through a suitable gear train thus providing rotation of cam drum 137. The speed of motor 155 is synchronized with the motor drive of the feeder 10. While FIG. 3 shows only a single group or pair of cams 145 and 145a, it should be pointed out that the cam drum 146 carries an additional number of groups of cams which operate valves for turret index control, dead plate ware control, blow mold control and control of the parison mold movement.

The valves for effecting the above mentioned operations are contained within a vertically disposed valve block 156, mounted on and within the upper structure support member 18. For example, a control valve 157 has a spool portion 158 which is relieved at 159 and 160. This valve is the control for actuating the mechanisms which move the plungers 32 horizontally and vertically. Thus, it can be seen that rotation of the cam drum 146 will result in reciprocatory movement of control valve 157 into and out of the valve block 156, and is actuated through a lever 161 fulcrumed at 162 in a forked extension 163 of the valve block 156. One end of the lever 161 has a fork 164 embracing pin 165 mounted in one end of the valve 157. The opposite end of lever 151 carries a cam roller 166, which is arranged in a plane parallel to the cam 145. A second cam roller 167 is also mounted on the lever 161 and in a second plane parallel to the cam 145a but vertically displaced from the plane containing the cam 145.

The fluid control system specific to the actuation of the mechanisms of this present invention is set forth schematically in FIG. 15 and operates as follows:

As a starting point, it will be assumed that the mechanical parts are in the position indicated in FIG. 15, which is the time just after the gobs have been received in parison mold cavities 25. The valve 157 has been positioned (as shown) by the cam 145 to permit fluid pressure to pass from the pressure line 168 and pressure chamber 169 through relieved portion 159 of the valve 157 into conduit 170. This pressure enters behind the power rack 108, moving same outwardly to the position shown in FIG. 15, rotating the gear 110, its shaft 105 and the lever 104. The movement of this lever 104 and its cam roll 103 in cam slot 102 will cause the slides 50 and their plungers 32 to move to the position shown in full lines in FIG. 15 and the power rack 109 to move to the position shown in FIG. 15. In this position the plungers 32 will be in vertical alignment with and between the gob guides 43 and the parison mold cavities 25 and ready for movement downwardly to the glass pressing position. Fluid from behind power rack 109 is forced out through conduit 171, relieved portion 133 in valve 128 into conduits 172 and 173 to exhaust past relieved portion 160 in valve 157 into the exhaust chamber 174 of the valve block 156. With completion of the stroke of rack 108, the pressure from conduit 170 then passes through conduit 144 into chamber 175 behind the valve 137, thus moving the same to the position shown in FIGS. 5 and 15. This permits pressure from main supply conduit 141 to pass through passage 140 of valve 137 into conduit 143, past relieved portion 134 of snubber valve 128, through a check valve 176 and into conduits 177 and 178 leading to the pressure regulators 179 and 180. The output of the pressure regulators 179 and 180 are connected by conduits 181 and 182 to the upper ends of the pistons 51 and 52, forcing them to move downwardly, thereby carrying the slides and their plungers 32 into glass pressing position. The fluid beneath the pistons 51 and 52 is exhausted first through conduits 183 and 184 but when the pistons 51 and 52 pass the exit openings for these two conduits, the fluid will pass out through conduits 185 and 186, through needle valves 187, into conduit 188. Conduit 188 leads to the valve 137 where the exhausting fluid will flow past the relieved portion 139 of valve 137. This exhausting fluid will pass to a conduit 188 through an adjustable needle valve 189. With the plungers 32 in down position, the snubber valve 128 will move upwardly as the roller 117 moves downwardly due to the constant pressure supplied to pin 131 by a conduit 190 connected to chamber 132, and this movement of valve 128 will disconnect conduit 117 from conduits 172 and 173 which lead to and from the control valve 157. As best shown in FIG. 16, this movement will also connect conduits 191 and 143 through relieved portion 134 in valve 128 and thus bypass check valve 176. With the completion of the pressing operation, the control valve 157 in valve block 156 will be shifted by cam 145a to permit pressure from the pressure chamber 169 to pass through relieved portion 160 of valve 157 and into conduit 173. This pressure will force the slide valve 137 to move to the right from the position shown in FIG. 15 and to exhaust fluid through conduits 144 and 170. Constant pressure fluid from main supply line 141 then passes through relieved portion 139 of valve 137 into conduit 183 and enters beneath the pistons 51 and 52, raising the plungers 32 from glass pressing position. The fluid from above the pistons 51 and 52 is exhausted through conduits 181 and 182 and the pressure regulators 179 and 180 into conduit 177. The fluid then bypasses the check valve 176 through conduit 191, passes through the relieved portion 134 of the snubber valve 128 (as illustrated in FIG. 16) into the conduit 143 and through relieved portion of valve 137 to exhaust through a needle valve 192. The vertical shaft 105 which provides the power for shifting the slides 50 in their horizontal movement is attached to the slideway 33 and moves therewith during its vertical movement to and from glass pressing position. The final portion of the upstroke of the pistons 51 and 52 will therefore carry the upper end of the shaft member 105 into contact with the roller 117 of lever 115. The lever 115, which is connected to the snubber valve 128 by link 127, will rock and move the valve 128 downwardly resulting in a pinching off of the flow of exhaust fluid from conduit 191 to the conduit 143. The feathering spot 135 on the valve 128 will prevent creep-up of the plungers 32 prior to the valve shifting and the feathering spot 136 functions to regulate the exhaust of the fluid to a gradual rather than an abrupt shut off at the end of the downward movement of valve 128. The relieved portion 133 will then permit fluid to flow from the supply conduit 173 through conduits 172 and 171 and enter behind the power rack 109, thereby rotating the gear 110, shaft 105, and through the cam 104 returns the slides 50 and their plungers 32 to their inactive or out of alignment position, as shown by the dotted line position in FIG. 15. This movement also places the intermediate gob guides 90 into alignment ready to guide the next pair of gobs into the blank mold cavities 25.

Referring to FIGS. 8 to 10, there is shown a safety mechanism for protecting the machine operator when working in the area between the plungers 32 and the parison mold 24. It is necessary for the operator to work in this area when replacing the plungers or molds as they become worn through extensive use. At these times, the machine is turned off and the source of pressure fluid to the machine is closed. To provide access to this area, it is desirable to have the plungers raised. With the operating pressure discontinued, the plungers 32, the slides 50, and slideways 33 will tend to move downwardly by reason of their mass and lack of pressure to sustain them in their "up" position. To prevent the plungers 32 from dropping when the pressure is cut off to the machine, a pair of locking detents 193 are engaged in teeth 194 carried by a pair of piston-like members 195 slidable in vertical passages 196 in the overlying support member 56. These piston-like members 195 are connected at their lower ends to the slideways 33 by a suitable connector 197. The two detents 193 are joined together by a flat bar 198. As best seen in FIG. 9, a spring 199 forces the bar 198 and detents 193 toward the piston-like members 195. This spring force is normally offset by the application of the machine operating pressure at 200 to a piston 201 whose operating end is in opposed abutting relationship to the bar 198 and spring 199. Thus it can be seen that as long as the operating pressure is connected to the machine, the detents 193 will be out of engagement with the piston-like members 195, but when the pressure is cut off, the detents 193 will engage the piston-like members 195 and hold the plungers 32 in raised position and prevent them from dropping.

A general summary of the operation of the mechanisms forming this present invention is approximately as follows:

The driving motor for the gob feeding device is interconnected to the motor drive 155 of the drum by a synchronizing motor drive so that the timing of the two mechanisms will be automatically synchronized.

A pair of gobs 39 of molten glass will be suspended beneath the feeder 10 and the shears 12, actuated by the cylinder 13, will sever and drop said gobs into the curved sections of the gob guides 40 positioned below and in alignment with the suspended gobs. The gobs continue to fall by gravity, passing along inclined sections 41 to the deflector sections 42 and then into the stationary gob guide sections 43 and intermediate gob guide sections 90 positioned above and in alignment with a pair of blank mold cavities 25 (FIGS. 1 and 14). At about the time the gobs 39 are ready to issue from the lower end of the sections 43 to enter into guides 90, the blank mold 24 will have reached its uppermost position in contact with the neck mold 23. Within a fraction of a second, these same gobs 39 are in the cavities 25 of the blank mold 24. The blank mold 24 is moved up under control of the pressure cylinder 29. The cam 145ª will then position control valve 157 to admit pressure to the conduit 170 and to the power rack 108 to rotate shaft 105 and move the slides 50 and plungers 32 horizontally into vertical alignment with the stationary gob guide sections 43 and the blank mold cavities 25. This same motion of shaft 105 will, through rack 101, gears 110 and 99, rotate shaft 97 and through cam roller 95 move the intermediate gob guides 90 out of alignment with the mold cavities.

Concomitant with this horizontal movement of the plungers, fluid pressure enters conduit 144 to shift valve 137 so as to admit fluid under pressure to conduit 143 and thence to the top ends of pistons 51 and 52. This pressure to these pistons will move the slideways 33, the slides 50 and their attached plungers 32 downward into glass pressing relationship with respect to the mold under a pressure sufficient to press the molten glass and form in the combined neck and blank molds a pair of parisons or alternatively, a finally shaped glass article.

With the completion of the pressing or shaping operation, the control valve 157 will be shifted by the cam 145 to supply fluid pressure to conduit 173 and shift valve 137 to provide pressure fluid from conduit 141 to conduits 183 and 184 at the bottom of pistons 51 and 52 and start raising the plungers 32 and slides 50 from the glass shaping position.

As the slideways 33 move upwardly, they carry the shaft 105 upwardly also and as this shaft reaches the latter portions of its upward movement, it is automatically interconnected to valve 128 and causes this valve to move downwardly. This downward movement of the valve 128 stops fluid in conduits 181 and 182 from passing to conduit 143 and exhausting through valve 192. This illustrates the snubbing action of valve 128. This movement of valve 128 also allows pressure fluid to flow from the control valve 157, through conduits 173, 172 and 171 to shift the power rack 100 and thereby rotate shafts 105 and 97 in a direction to move the plungers 32 horizontally to their inactive position and bring the intermediate gob guide sections 90 to their active position in alignment with the vertical gob guides 43 and the mold cavities 25.

At the same time as the plungers 60 are moving upwardly, the blank molds 24 are being moved downwardly away from the pressed glass, their movement being controlled by the supply of fluid pressure through conduit 30 to move piston 28 and the blank molds 24 downwardly.

When the plungers 32 and the blank molds 24, in their relative vertical movements, have both moved vertically a sufficient distance to clear the pressed glass, the turret 42 will be indexed to bring a successive set of neck molds 45 to the glass pressing station. At this time the several mechanisms will be in the position shown in FIGS. 4 and 14, i.e., ready to commence a succeeding molding cycle and perform the several operations in seriatum.

Modifications may be resorted to within the spirit and scope of the appended claims.

We claim:

1. A mechanism for delivering to and shaping successive charges of molten glass in a shaping mold, comprising in combination a base, an upper support member mounted on said base, said upper support member having a vertical opening therethrough, a vertically disposed stationary gob guide section mounted in said opening, a glass shaping mold mounted on said base beneath and in vertical alignment with said stationary gob guide section, a vertically disposed movable intermediate gob guide section, means connected to said upper support member for supporting said intermediate gob guide section between said stationary gob guide section and said shaping mold, a vertically disposed glass shaping plunger, means connected to said upper support member for supporting said plunger between said stationary section and said mold, the vertical axis of said plunger being parallel to said intermediate section, means extending out of said upper support member and connected to said first mentioned means for laterally shifting said intermediate section into and out of alignment with said stationary section, motor means mounted in said upper support member and connected to said second mentioned means for laterally shifting said plunger into and out of vertical alignment with said mold, means mounted in said upper support member and inter-connecting the inner ends of said shifting means for effecting concurrent lateral movement of said plunger and said intermediate section, means for elevating and retracting said mold into and out of position to receive the charges of molten glass, a source of fluid under pressure, hydraulically actuated means mounted in said upper support member and connected to said plunger supporting means, means responsive to movement of said plunger into vertical alignment with the mold for connecting said source of fluid under pressure to said hydraulically actuated means for forcing the plunger downward into the mold, and pressure regulating means interposed said source of fluid under pressure and said hydraulically actuated means for controlling the pressing force of said plunger.

2. In a mechanism for delivering to and shaping successive charges of molten glass in a shaping mold, comprising in combination a base, an upper support member mounted above said base, a bearing housing having a vertical cylindrical bore therethrough, mounted in said upper support member, a tubular sleeve member slidably received in said bore and extending below said upper support member, a stationary gob guide section connected to said upper support member and extending telescopically within said sleeve, a horizontal slideway formed on the lower end of said tubular sleeve, a slide mounted in said slideway for horizontal reciprocation, a depending plunger attached to said slide, means extending out of said upper support member and connected to said slide for moving said slide and plunger into and out of vertical alignment with said stationary guide section, a first fluid motor mounted in said upper support member and connected to said means for moving said slide, a shaping mold below and in alignment with stationary guide section, means mounted on said base and connected to said mold for elevating and retracting said shaping mold, second fluid motor means mounted in said upper support member and connected to said slideway for vertically reciprocating said slideway and plunger, a source of fluid under pressure, means connecting said source of fluid to said first fluid motor and means responsive to actuation of said first fluid motor a predetermined amount for connecting said source of fluid under pressure to said second fluid motor means.

3. In a mechanism for successively shaping plural charges of molten glass in a plural cavitied shaping mold, comprising in combination a base, an upper structure support member mounted above said base, a horizontal rotatable turret, a plurality of pairs of neck molds carried by said turret, means connected to the center of said turret and extending downward from said support member for supporting and rotating said turret, a pair of vertically disposed stationary gob guide sections mounted in and extending through said support member in alignment with a pair of neck molds carried by said turret, a pair of vertically disposed axially movable sleeve members mounted in said support member, said sleeve members surrounding said guide sections, a horizontal slideway formed on the lower end of each sleeve member, a slide mounted in each slideway, a shaping plunger connected to and depending from each slide, means for horizontally shifting said slides and plungers relative to said slideways into and out of alignment with and between said guide sections and neck molds, a shaping mold having a pair of cavities therein, means for mounting said shaping mold on said base for vertical reciprocation toward and away from said neck molds, reciprocating piston type fluid motor means mounted in said upper structure support member and having their pistons connected to said slideways for lowering and raising said plungers, slides and slideways relative to said neck molds, a source of fluid under pressure, an exhaust passage, shiftable valve means for alternately connecting opposite ends of said motor means to said fluid pressure source and said exhaust passage respectively, fluid pressure regulating means interposed said source of fluid under pressure and the upper ends of said fluid motor means for controlling the pressing force of said plungers, a snubber valve connected to the upper ends of said motor through which fluid passes to said exhaust passage on the upward stroke of said piston motor means, and adjustable connecting means connected to a slideway for shifting said snubber valve in response to a predetermined upward movement of said slideway for cutting off the exhaust of fluid from said motor means whereby said upward movement of said slideways and plungers is controlled.

4. In a mechanism for successively shaping plural charges of molten glass in a plural cavitied shaping mold, comprising in combination a base, an upper structure support member mounted above said base, a horizontal rotatable turret, a plurality of pairs of neck molds carried by said turret, means connected to the center of said turret and extending downward from said support member for supporting and rotating said turret, a pair of vertically disposed stationary gob guide sections mounted in and extending through said support member in alignment with a pair of neck molds carried by said turret, a pair of vertically disposed axially movable sleeve members mounted in support member, said sleeve members surrounding said guide sections, a horizontal slideway formed on the lower end of each sleeve member, a slide mounted in each slideway, a shaping plunger connected to and depending from each slide, means for horizontally shifting said slides and plungers relative to said slideways into and out of alignment between said guide sections and neck molds, a shaping mold having a pair of cavities therein, means for mounting said shaping mold on said base for vertical reciprocation toward and away from said neck molds, double-acting fluid pressure actuated means connected to said slideways for lowering and raising said plungers, slides and slideways relative to said neck molds, a source of fluid under pressure, an exhaust passage, means for connecting said source to said pressure actuated means to alternately raise and lower said plungers, means for alternately connecting the pressure actuated means to said exhaust passage, fluid pressure regulating means interposed between said source and said pressure actuated means for regulating the pressing force of said plungers, a snubber valve in said exhaust passage and means responsive to movement of said slideways in an upward direction a predetermined distance for shifting said snubber valve into position for cutting off the exhaust of fluid from said pressure actuated means whereby said slideways and plungers are controlled in their upward movement.

References Cited by the Examiner
UNITED STATES PATENTS

| | | | |
|---|---|---|---|
| 1,679,848 | 8/28 | Barker | 65—223 |
| 1,852,570 | 4/32 | Hofmann | 65—224 |
| 1,982,103 | 11/34 | Hiller | 65—76 |
| 2,224,767 | 12/40 | Du Bois | 65—221 |
| 2,225,948 | 12/40 | Beatty | 65—64 |
| 2,282,449 | 5/42 | Bert | 65—223 |
| 2,732,665 | 1/56 | Cassell | 65—223 |
| 2,984,047 | 5/61 | Mennitt et al. | 65—222 |

DONALL H. SYLVESTER, *Primary Examiner.*

ARTHUR P. KENT, MORRIS O. WOLK, *Examiners.*